(12) United States Patent
Atreya et al.

(10) Patent No.: US 10,616,714 B2
(45) Date of Patent: Apr. 7, 2020

(54) WIFI DEVICE ZONING USING MICRO-LOCATION DATA

(71) Applicant: Avaya Inc., Basking Ridge, NJ (US)

(72) Inventors: Vivek L. Atreya, Bangalore (IN); Shashi Hosakere Ankaiah, Bangalore (IN); Poornima Munirajaiah, Bangalore (IN); Pavan Kumar Chikmagalur Siddegowada, Karnataka (IN)

(73) Assignee: Avaya Inc., Santa Clara, CA (US)

(*) Notice: Subject to any disclaimer, the term of this patent is extended or adjusted under 35 U.S.C. 154(b) by 0 days.

(21) Appl. No.: 14/533,043

(22) Filed: Nov. 4, 2014

(65) Prior Publication Data

US 2016/0128018 A1 May 5, 2016

(51) Int. Cl.
*H04W 4/02* (2018.01)
*H04W 4/80* (2018.01)
*H04W 64/00* (2009.01)
*G01S 5/02* (2010.01)
*H04W 84/18* (2009.01)

(52) U.S. Cl.
CPC .......... *H04W 4/023* (2013.01); *G01S 5/0252* (2013.01); *H04W 4/80* (2018.02); *H04W 64/00* (2013.01); *H04W 84/18* (2013.01)

(58) Field of Classification Search
CPC ..... H04W 64/003; H04W 4/008; H04W 4/04; H04W 88/08; H04L 5/006
See application file for complete search history.

(56) References Cited

U.S. PATENT DOCUMENTS

| | | | | |
|---|---|---|---|---|
| 2014/0011518 A1* | 1/2014 | Valaee | ................ | H04W 64/00 455/456.1 |
| 2014/0187270 A1* | 7/2014 | Zinin | .................... | H04W 4/021 455/456.3 |
| 2014/0335893 A1* | 11/2014 | Ronen | .................. | G01S 5/0252 455/456.1 |
| 2015/0208226 A1* | 7/2015 | Kuusilinna | ........... | H04W 8/005 455/414.3 |
| 2015/0327022 A1* | 11/2015 | Lin | ...................... | H04W 40/244 455/456.1 |
| 2016/0029155 A1* | 1/2016 | Kerr | ...................... | H04W 4/029 455/456.3 |

* cited by examiner

*Primary Examiner* — Patrick N Edouard
*Assistant Examiner* — Eboni N Giles
(74) *Attorney, Agent, or Firm* — IP Spring

(57) ABSTRACT

Methods, systems and computer readable media for wireless device zoning using micro-location data are described.

23 Claims, 4 Drawing Sheets

WIFI DEVICE ZONING USING MICRO-LOCATION DATA

TECHNICAL FIELD

Embodiments relate generally to computer networks, and more particularly, to methods, systems and computer readable media for wireless device zoning using micro-location data.

BACKGROUND

Micro-location refers to identifying the location of objects within the radius of approximately a meter, usually in indoor environments. Micro-location is often associated with specialized micro-location initiators, receivers or systems (e.g., near field communication (NFC) initiators, beacons systems (e.g., iBeacons), Bluetooth low energy or the like). Zoning refers to a small geographical area around an object of interest. Wireless device clients can receive notifications when they enter zones. Clients can then request for data related to these zones. While GPS can determine a client's geo-location reasonably accurately, GPS may not be very accurate in dense urban areas and indoors.

Location positioning systems based on WiFi signals have been the most popular and widely deployed. A number of algorithms have been used over the years to identify client location using WiFi data, e.g., closest AP, trilateration, triangulation, TDOA, and RF-fingerprinting, to name a few. Of the above-mentioned methods, the RF-fingerprint based algorithm may offer the most granular location tracking. However, implementing RF-fingerprinting can have challenges.

Some challenges of RF-fingerprinting can include a need to collect RF-fingerprints that are current and accurate. Some of the challenges in keeping the RF-fingerprints current and accurate can include: the possibility that RF signal strength may vary widely at a moment's notice, causing unreliability in measurements. Also, RF environments may change over weeks and months, so an RF fingerprint taken on a given day may not be valid for that location in the future. Further, calibration of RF-fingerprinting can be a labor intensive, repetitious and expensive process.

The challenges associated with WiFi based micro-location may have prompted the development of alternate solutions (e.g., iBeacons, NFC, Bluetooth low energy and the like). These alternate solutions include custom built devices to offer micro-location. However, support for these technologies (e.g., iBeacons, NFC, Bluetooth low energy and the like) on end user wireless devices is not ubiquitous. Each technology is pushed by different vendors or forums. Only a set of client devices may support one or more of the above technologies. If a customer deploys one of the above technologies, the location features may be available only to a subset of the total target users.

Embodiments were conceived in light of the above mentioned needs, problems and/or limitations, among other things.

SUMMARY

One or more embodiments can include methods, systems and computer readable media for wireless device zoning using micro-location data. In some implementations, the method can include determining that a first client device having micro-location determination capability has entered a micro-location initiator zone, and receiving micro-location initiator information from the first client. The method can also include performing a radio frequency (RF) fingerprinting process on the first client using wireless network infrastructure to generate an RF fingerprint of the micro-location zone. The method can further include determining a second client device has roamed into an area near the micro-location initiator, and comparing an RF fingerprint of the second client device with the RF fingerprint of the micro-location zone. The method can also include providing micro-location zone information to the second client when the RF fingerprint of the second client device matches the RF fingerprint of the micro-location zone within a given threshold.

The micro-location initiator information can include one or more of micro-location initiator device identifier, micro-location signal information and estimated relative distance from the micro-location initiator to the first client device. Performing the RF fingerprinting can include receiving RF information about the first client from one or more wireless access points, the RF information including one or more of RSSI and SNR.

The micro-location initiator can include an iBeacon. The micro-location initiator can include a near field communication device. The micro-location initiator can include a Bluetooth device.

Some implementations can include a system comprising one or more processors configured to perform operations. The operations can include determining that a first client device having micro-location determination capability has entered a micro-location initiator zone and receiving micro-location initiator information from the first client. The operations can also include performing a radio frequency (RF) fingerprinting process on the first client using wireless network infrastructure to generate an RF fingerprint of the micro-location zone. The operations can further include determining a second client device has roamed into an area near the micro-location initiator, and comparing an RF fingerprint of the second client device with the RF fingerprint of the micro-location zone. The operations can also include providing micro-location zone information to the second client when the RF fingerprint of the second client device matches the RF fingerprint of the micro-location zone within a given threshold.

The micro-location initiator information can include one or more of micro-location initiator device identifier, micro-location signal information and estimated relative distance from the micro-location initiator to the first client device. Performing the RF fingerprinting can include receiving RF information about the first client from one or more wireless access points, the RF information including one or more of RSSI and SNR.

The micro-location initiator can include an iBeacon. The micro-location initiator can include a near field communication device. The micro-location initiator can include a Bluetooth device.

Some implementations can include a nontransitory computer readable medium having stored thereon software instructions that, when executed by one or more processors, cause the one or more processors to perform operations. The operations can also include performing a radio frequency (RF) fingerprinting process on the first client using wireless network infrastructure to generate an RF fingerprint of the micro-location zone. The operations can further include determining a second client device has roamed into an area near the micro-location initiator, and comparing an RF fingerprint of the second client device with the RF fingerprint of the micro-location zone. The operations can also include providing micro-location zone information to the second client when the RF fingerprint of the second client device matches the RF fingerprint of the micro-location zone within a given threshold.

The micro-location initiator information can include one or more of micro-location initiator device identifier, micro-location signal information and estimated relative distance from the micro-location initiator to the first client device. Performing the RF fingerprinting can include receiving RF information about the first client from one or more wireless access points, the RF information including one or more of RSSI and SNR.

The micro-location initiator can include an iBeacon. The micro-location initiator can include a near field communication device. The micro-location initiator can include a Bluetooth device.

In any of the above implementations, determining a second client device has roamed into an area near the micro-location initiator can include determining that the second client device has associated with a wireless access point providing coverage at or near the micro-location initiator zone.

DETAILED DESCRIPTION

In general, some implementations can provide an advantage of enabling micro-location based zoning for all WiFi enabled clients. For example, if a user base includes 40% micro-location enable device users (e.g., iBeacon/NFC users), using these users, micro-location based services can be provided for the other 60% of Wi-Fi only device users. Also, some implementations can reduce or eliminate the often labor intensive, expensive process of maintaining an accurate and current RF-fingerprint database. Some implementations can work with an existing hardware/software infrastructure. Deployment and maintenance of a system as described herein is not complex. Some implementations provide an advantage of RF fingerprinting results that are accurate and stable Implementations can handle changes in topology (e.g., walls, furniture or the like) well.

Some implementations can be configured to use data gathered from micro-location (e.g., iBeacon or NFC) enabled client devices to offer micro-locations to all WiFi users. The iBeacon/NFC transmitters/initiators are plotted on the location maps and can be read by the WiFi location positioning (or determination) system (e.g., a location engine backend system). In some implementations, iBeacon/NFC enabled client devices provide support to discover and estimate distance to iBeacon/NFC transmitter/initiator devices. It will be appreciated that iBeacon, NFC or other micro-location systems are discussed herein by way of examples for illustration purposes and that any suitable micro-location system and/or wireless network system can be used.

Figure 1:
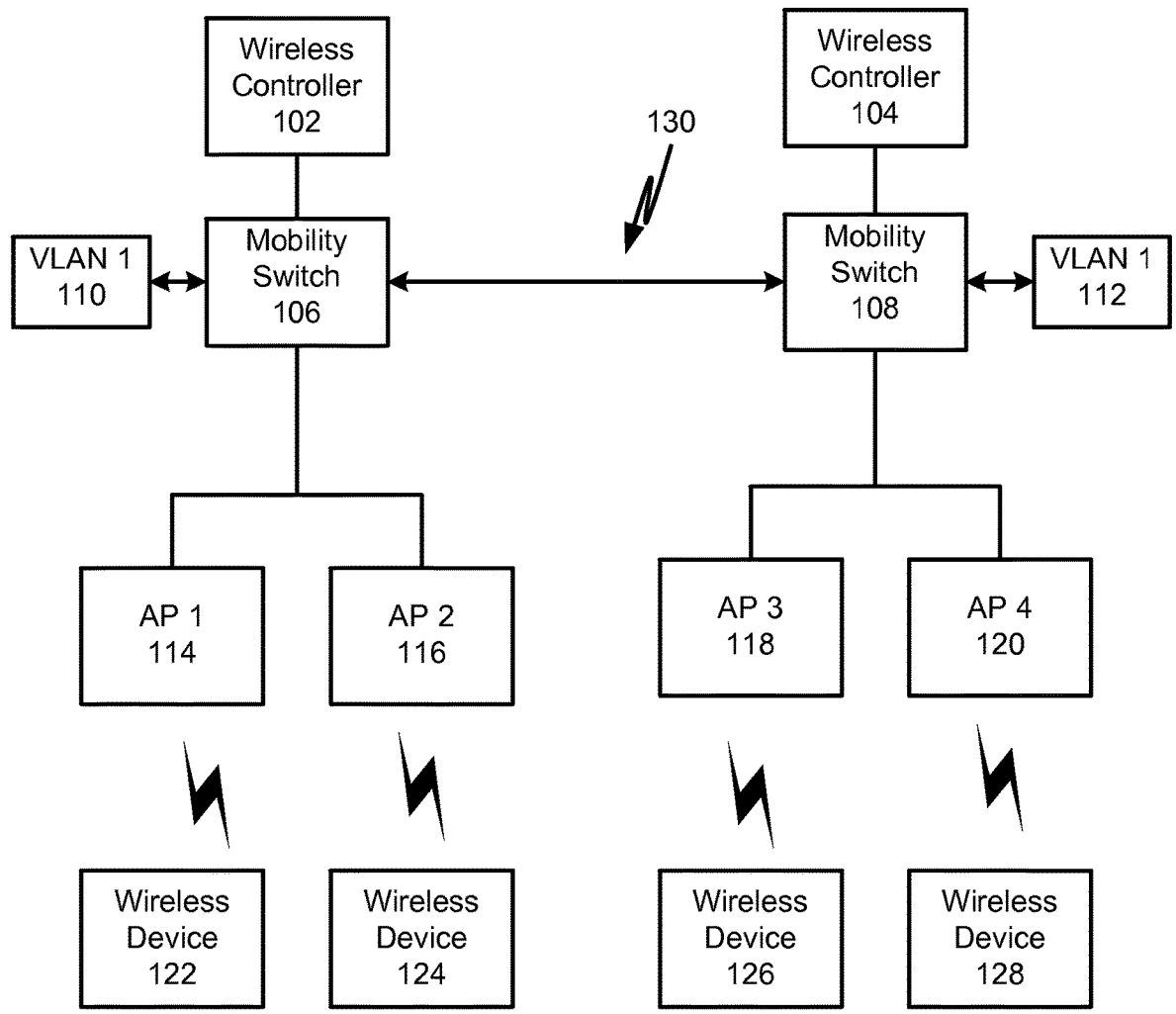
FIG. 1 is a diagram of an example wireless network in accordance with at least one implementation.

As shown in FIG. 1, an example wireless network 100 (e.g., enterprise WLAN) includes wireless controllers (102 and 104) connected to respective mobility switches (or unified switches) 106 and 108. Each mobility switch (106 and 108) is connected to a respective VLAN (or MVLAN) 110, 112 and serves as the gateway for its corresponding VLAN (there can be more than one mobility switch or unified switch in each VLAN, but only one per VLAN will be designated as the gateway). Access points 114-120 are connected to corresponding unified switches 106, 108. Client devices 122-128 connect to the network via one of the access points 114-120. One or more mobility tunnels 130 connect the mobility switches (106 and 108).

In operation, the client devices 122-128 can include a heterogeneous group of devices that may have different location service capabilities. For example, some may be WiFi only devices, while others may have one or more types of micro-location system capabilities.

Figure 2:
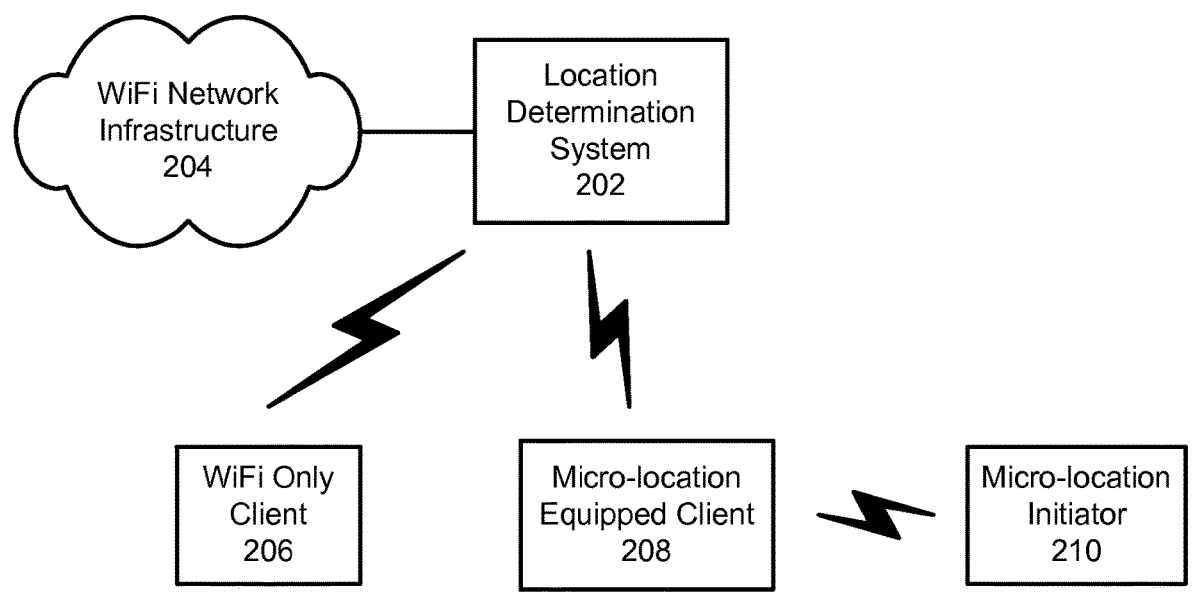
FIG. 2 is a diagram of an example wireless device location using micro-location data system in accordance with at least one implementation.

FIG. 2 is a diagram of an example wireless device location using micro-location data system in accordance with at least one implementation. A location determination system 202 is coupled to a wireless (e.g., WiFi) network infrastructure 204. The location determination system 202 can analyze information from one or more client devices (e.g., 206 and 208) to provide micro-location zoning to a WiFi only client device 206 based on micro-location information obtained from a micro-location equipped client 208.

In some implementations, a location application running on the micro-location equipped client device 208 discovers and estimates distances to the micro-location initiator or emitter 210 (e.g., an iBeacon or NFC device). The location application on the client device 208 transfers the data gathered (e.g., device ID, signal strength, distance to emitter or the like) to the WiFi location determination system 202. The WiFi location determination system 202, upon receiving this message from the client 208, initiates a message towards the WLAN infrastructure 204 to initiate RF-fingerprinting of the client 208.

In RF fingerprinting, each location may have a unique radio frequency "spectral fingerprint." Determining an RF fingerprint involves an offline training phase and an online localization phase. A spectral fingerprint in this context can include a predetermined combination of observable RF spectral parameters (e.g., reflection, attenuation, multi-paths or the like). In an offline mode, many RF fingerprints can be collected from predetermined locations and a spectral fingerprint database can be created.

RF fingerprint collection can be computationally intensive with computation repeated for every coordinate and access point since each access point will hear the device at different signal strengths. Client accurate location details are computed in online localization phase. Approximate location of a client is assumed and the fingerprints are obtained. These results are compared with the spectral fingerprint database to identify a geographic location of the client and a required correction is made to the assumed location to generate a new "fingerprint". The above steps can be repeated until accurate information is obtained on the location of the client device.

The APs which are in the RF neighborhood of the client measure various client RF parameters (e.g., RSSI, SNR and the like). The APs send the gathered data to the location determination system. The WiFi location determination system 202 gathers the RF parameters from the reporting APs and creates an RF-fingerprint. The WiFi location determination system 202 ties the measured RF fingerprint to the location zone associated with the micro-location initiator or emitter device 208. This permits the WiFi location determination system to keep accurate and current RF-fingerprints of locations of interest. The WiFi location determination system can use the gathered RF-fingerprints to extend micro-location to all WiFi clients (e.g., WiFi only client 206). The WiFi location determination system continuously matches client RF-fingerprints against fingerprints stored for various zones. When a match is identified, the WiFi location determination system notifies the client about the zone it has entered. The client can then poll related applications for data related to the zone.

Figure 3:
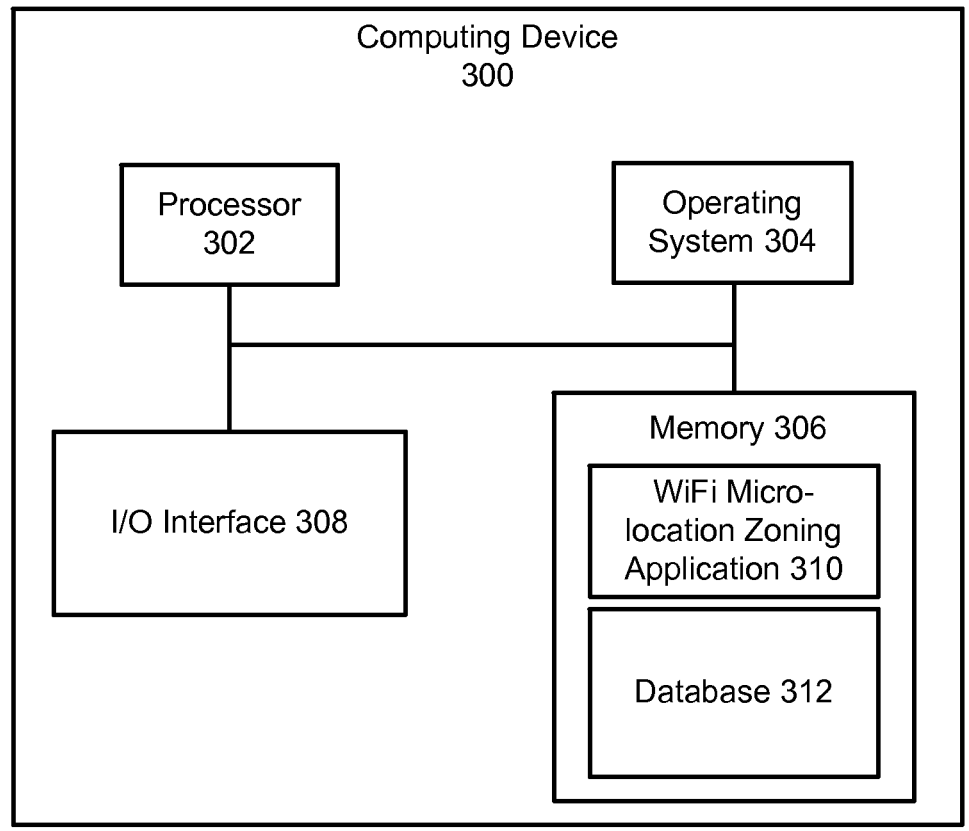
FIG. 3 is a diagram of an example computer system for wireless device location using micro-location data in accordance with at least one implementation.

FIG. 3 is a diagram of an example computer system 300 in accordance with at least one implementation. The computer 300 includes a processor 302, operating system 304, memory 306 and I/O interface 308. The memory 306 can include a wireless device zoning using micro-location data application 310 and a database 312 (e.g., for storing RF fingerprint information, micro-location initiator information or the like).

In operation, the processor 302 may execute the application 310 stored in the memory 306. The application 310 can include software instructions that, when executed by the processor, cause the processor to perform operations for wireless device zoning using micro-location data in accordance with the present disclosure (e.g., performing one or more of steps 402-414 described below). The application program 310 can operate in conjunction with the database 312 and the operating system 304.

Figure 4:
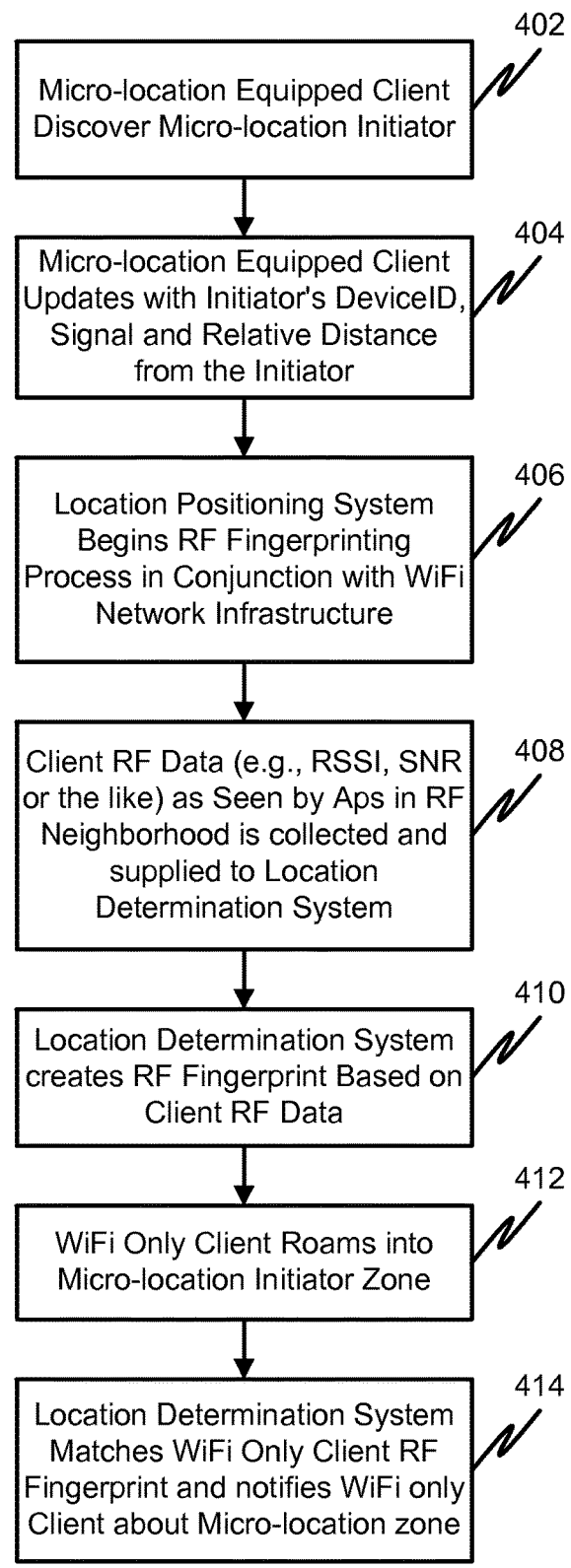
FIG. 4 is a flow chart of an example method for wireless device location using micro-location data in accordance with at least one implementation.

FIG. 4 is a flow chart of an example method for wireless device zoning using micro-location data in accordance with at least one implementation. Processing begins at 402, where a micro-location equipped client device discovers a micro-location initiator or emitter. For example, a micro-location equipped client (e.g., 208) discovers a micro-location initiator (e.g., 210). Processing continues to 404.

At 404, the micro-location equipped client updates with information from the micro-location such as initiator device ID, signal information, relative distance from the client to the initiator or the like. Processing continues to 406.

At 406, the location determination system begins an RF fingerprinting process for the micro-location equipped client in conjunction with the WiFi network infrastructure. Processing continues to 408.

At 408, micro-location equipped client RF data (e.g., RSSI, SNR or the like) as seen by one or more access points (or APs) in an RF neighborhood is collected and supplied to the location determination system. Processing continues to 410.

At 410, the location determination system creates an RF fingerprint corresponding to the area or zone of the micro-location initiator. Processing continues to 412.

At 412, the location determination system detects that a client with WiFi and without micro-location capability (or with a micro-location capability that is not supported at the zone) has roamed into the micro-location initiator zone. Processing continues to 414.

At 414, the location determination system matches the WiFi only client RF fingerprint and notifies the WiFi only client about the micro-location zone. It will be appreciated that 402-414 can be repeated in whole or in part. For example, 402-410 can be repeated periodically (e.g., every hour, day, week or the like) or as new micro-location equipped clients enter the zone.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C #.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for wireless device zoning using micro-location data.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
   determining that a first client device having a micro-location determination system has entered a micro-location zone, wherein the micro-location determination system includes a micro-location receiver, and wherein the micro-location determination system provides, to the first client device, a location having a first location resolution;
   receiving micro-location zone information from the first client device, wherein the micro-location zone information is based on a micro-location signal received by the micro-location receiver of the first client device from a micro-location device including one of a micro-location initiator and a micro-location emitter, and wherein the micro-location zone information includes a distance from the micro-location device to the first client device;
   based on the received micro-location zone information, requesting a wireless network infrastructure to initiate a radio frequency (RF) fingerprinting process of the first client device;
   performing the RF fingerprinting process of the first client device using the wireless network infrastructure to generate an RF fingerprint of the micro-location zone, wherein the RF fingerprinting process comprises:
      comparing a fingerprint of an approximate location of the first client device with a spectral fingerprint database to obtain an accurate location of the first client device to generate the RF fingerprint;
   associating the RF fingerprint of the first client device with the micro-location zone information received from the first client device;
   performing a second RF fingerprinting process using the wireless network infrastructure to generate an RF fingerprint of a second client device not having a micro-location system, wherein the second client device includes a location system providing location information to the second client device at a second location resolution, and wherein the first location resolution is more granular than the second location resolution;
   comparing the RF fingerprint of the second client device with the RF fingerprint associated with the micro-location zone;
   providing the second client device with location information at the first location resolution including an indication that the second client device has entered the micro-location zone when the RF fingerprint of the second client device matches the RF fingerprint associated with the micro-location zone within a given threshold such that the second client device can determine location at the first location resolution without having a micro-location system within the second client device; and
   polling, at the second client device, one or more related applications for data corresponding to the micro-location zone.

2. The method of claim 1, wherein the micro-location zone information includes one or more of micro-location initiator device identifier, micro-location signal information and estimated relative distance from a micro-location initiator to the first client device.

3. The method of claim 1, wherein performing the RF fingerprinting includes receiving RF information about the first client device from one or more wireless access points, the RF information including one or more of RSSI and SNR.

4. The method of claim 2, wherein the micro-location initiator includes an iBeacon.

5. The method of claim 2, wherein the micro-location initiator includes a near field communication device.

6. The method of claim 2, wherein the micro-location initiator includes a Bluetooth device.

7. A system comprising one or more processors configured to perform operations including:
   determining that a first client device having a micro-location determination system has entered a micro-location zone, wherein the micro-location determination system includes a micro-location receiver, and wherein the micro-location determination system provides, to the first client device, a location having a first location resolution;
   receiving micro-location zone information from the first client device, wherein the micro-location zone information is based on a micro-location signal received by the micro-location receiver of the first client device from a micro-location device including one of a micro-location initiator and a micro-location emitter, and wherein the micro-location zone information includes a distance from the micro-location device to the first client device;
   based on the received micro-location zone information, requesting a wireless network infrastructure to initiate a radio frequency (RF) fingerprinting process of the first client device;
   performing the RF fingerprinting process on the first client device using the wireless network infrastructure to generate an RF fingerprint of the micro-location zone, wherein the RF fingerprinting process comprises:
comparing a fingerprint of an approximate location of the first client device with a spectral fingerprint database to obtain an accurate location of the first client device to generate the RF fingerprint;
associating the RF fingerprint of the first client device with the micro-location zone information received from the first client device;
performing a second RF fingerprinting process using the wireless network infrastructure to generate an RF fingerprint of a second client device not having a micro-location system, wherein the second client device includes a location system providing location information to the second client device at a second location resolution, and wherein the first location resolution is more granular than the second location resolution;
comparing the RF fingerprint of the second client device not having micro-location capability with the RF fingerprint associated with the micro-location zone;
providing the second client device with location information at the first location resolution including an indication that the second client device has entered the micro-location zone when the RF fingerprint of the second client device matches the RF fingerprint associated with the micro-location zone within a given threshold such that the second client device can determine location at the first location resolution without having a micro-location system within the second client device; and
polling, at the second client device, one or more related applications for data corresponding to the micro-location zone.

8. The system of claim 7, wherein the micro-location zone information includes one or more of micro-location initiator device identifier, micro-location signal information and estimated relative distance from a micro-location initiator to the first client device.

9. The system of claim 7, wherein performing the RF fingerprinting includes receiving RF information about the first client device from one or more wireless access points, the RF information including one or more of RSSI and SNR.

10. The system of claim 8 wherein the micro-location initiator includes an iBeacon.

11. The system of claim 8, wherein the micro-location initiator includes a near field communication device.

12. The system of claim 8, wherein the micro-location initiator includes a Bluetooth device.

13. A nontransitory computer readable medium having stored thereon software instructions that, when executed by one or more processors, cause the one or more processors to perform operations including:
determining that a first client device having a micro-location determination system has entered a micro-location zone, wherein the micro-location determination system includes a micro-location receiver, and wherein the micro-location determination system provides, to the first client device, a location having a first location resolution;
receiving micro-location zone information from the first client device, wherein the micro-location zone information is based on a micro-location signal received by the micro-location receiver of the first client device from a micro-location device including one of a micro-location initiator and a micro-location emitter, and wherein the micro-location zone information includes a distance from the micro-location device to the first client device;
based on the received micro-location zone information, requesting a wireless network infrastructure to initiate a radio frequency (RF) fingerprinting process of the first client device;
performing the RF fingerprinting process on the first client device using the wireless network infrastructure to generate an RF fingerprint of the micro-location zone, wherein the RF fingerprinting process comprises:
comparing a fingerprint of an approximate location of the first client device with a spectral fingerprint database to obtain an accurate location of the first client device to generate the RF fingerprint;
associating the RF fingerprint of the first client device with the micro-location zone information received from the first client device;
performing a second RF fingerprinting process using the wireless network infrastructure to generate an RF fingerprint of a second client device not having a micro-location system, wherein the second client device includes a location system providing location information to the second client device at a second location resolution, and wherein the first location resolution is more granular than the second location resolution;
comparing the RF fingerprint of the second client device with the RF fingerprint associated with the micro-location zone;
providing the second client device with location information at the first location resolution including an indication that the second client device has entered the micro-location zone when the RF fingerprint of the second client device matches the RF fingerprint associated with the micro-location zone within a given threshold such that the second client device can determine location at the first location resolution without having a micro-location system within the second client device; and
polling, at the second client device, one or more related applications for data corresponding to the micro-location zone.

14. The nontransitory computer readable medium of claim 13, wherein the micro-location zone information includes one or more of a micro-location initiator device identifier, micro-location signal information and an estimated relative distance from a micro-location initiator to the first client device.

15. The nontransitory computer readable medium of claim 13, wherein performing the RF fingerprinting includes receiving RF information about the first client device from one or more wireless access points, the RF information including one or more of RSSI and SNR.

16. The nontransitory computer readable medium of claim 14, wherein the micro-location initiator includes an iBeacon.

17. The nontransitory computer readable medium of claim 14, wherein the micro-location initiator includes a near field communication device.

18. The nontransitory computer readable medium of claim 14, wherein the micro-location initiator includes a Bluetooth device.

19. The method of claim 1, wherein determining a second client device has roamed into an area near the micro-location zone includes determining that the second client device has associated with a wireless access point providing coverage at or near the micro-location zone.

20. The system of claim 7, wherein determining a second client device has roamed into an area near the micro-location zone includes determining that the second client device has associated with a wireless access point providing coverage at or near the micro-location zone.

21. The method of claim 1, wherein the micro-location receiver includes one of a near field communication (NFC) initiator, a beacons system, or a Bluetooth low energy device.

22. The system of claim 7, wherein the micro-location receiver includes one of a near field communication (NFC) initiator, a beacons system, or a Bluetooth low energy device.

23. The nontransitory computer readable medium of claim 13, wherein the micro-location receiver includes one of a near field communication (NFC) initiator, a beacons system, or a Bluetooth low energy device.

\* \* \* \* \*